US012711825B2

(12) United States Patent
Hess et al.

(10) Patent No.: US 12,711,825 B2
(45) Date of Patent: Aug. 18, 2026

(54) AUTHENTICATION OF A USER FOR ACCESS

(71) Applicant: trinamiX GmbH, Ludwigshafen am Rhein (DE)

(72) Inventors: Christian Hess, Ludwigshafen am Rhein (DE); Friedrich Schick, Munich (DE)

(73) Assignee: TRINAMIX GMBH, Ludwigshafen am Rhein (DE)

( * ) Notice: Subject to any disclaimer, the term of this patent is extended or adjusted under 35 U.S.C. 154(b) by 302 days.

(21) Appl. No.: 18/552,962

(22) PCT Filed: Feb. 13, 2023

(86) PCT No.: PCT/EP2023/053420
§ 371 (c)(1),
(2) Date: Sep. 28, 2023

(87) PCT Pub. No.: WO2023/156313
PCT Pub. Date: Aug. 24, 2023

(65) Prior Publication Data

US 2024/0194011 A1 Jun. 13, 2024

(30) Foreign Application Priority Data

Feb. 15, 2022 (EP) .................................... 22156760

(51) Int. Cl.
*G07C 9/25* (2020.01)

(52) U.S. Cl.
CPC .................................. *G07C 9/257* (2020.01)

(58) Field of Classification Search
CPC ................................. G07C 9/257; G07C 9/25
See application file for complete search history.

(56) References Cited

U.S. PATENT DOCUMENTS 6,856,873 B2 * 2/2005 Breed .................... B60Q 1/143 701/45
7,602,947 B1 * 10/2009 Lemelson ............. B60R 25/252 382/116
9,007,438 B2 * 4/2015 Mestha .................. G06V 20/64 348/148
2004/0234109 A1 * 11/2004 Lemelson ............ B60R 25/305 382/118
2007/0009139 A1 1/2007 Landschaft et al.
(Continued)

FOREIGN PATENT DOCUMENTS

EP 1955290 B1 10/2010
WO 2020148740 A2 7/2020

OTHER PUBLICATIONS

International Search Report and Written Opinion for corresponding PCT/EP23/53420, mailed Apr. 21, 2023, 11 pages.

*Primary Examiner* — Solomon G Bezuayehu
(74) *Attorney, Agent, or Firm* — Armstrong Teasdale LLP

(57) ABSTRACT

Disclosed herein is a method for authenticating a user for access to a vehicle, including:
a. receiving an access request,
b. in response to the access request, recording an image,
c. extracting at least one facial feature of the image,
d. receiving a template,
e. generating an access signal indicative of whether the user has access based on a comparison of the at least one facial feature and the template, and
f. outputting the access signal.

20 Claims, 3 Drawing Sheets

(56) References Cited

U.S. PATENT DOCUMENTS

| | | | | |
|---|---|---|---|---|
| 2007/0232929 | A1* | 10/2007 | Kilgore | G06V 40/40 600/473 |
| 2013/0307932 | A1* | 11/2013 | Mestha | H04N 23/21 348/E5.029 |
| 2014/0016837 | A1* | 1/2014 | Nechyba | G06V 40/176 382/118 |
| 2015/0269409 | A1* | 9/2015 | Weber | H04W 12/06 382/125 |
| 2015/0363986 | A1* | 12/2015 | Hoyos | H04W 12/08 340/5.61 |
| 2016/0070968 | A1* | 3/2016 | Gu | G06T 7/337 382/125 |
| 2016/0155006 | A1* | 6/2016 | Makkapati | G06V 40/10 382/128 |
| 2016/0300410 | A1* | 10/2016 | Jones | G07C 9/253 |
| 2017/0032185 | A1* | 2/2017 | Zhang | G06V 10/993 |
| 2017/0150124 | A1* | 5/2017 | Thuries | G06V 10/145 |
| 2018/0196998 | A1* | 7/2018 | Price | G01S 17/894 |
| 2019/0080149 | A1* | 3/2019 | Gernoth | G06V 40/166 |
| 2020/0287897 | A1* | 9/2020 | Jha | H04L 9/3231 |
| 2021/0279499 | A1 | 9/2021 | Sirotin et al. | |

* cited by examiner

AUTHENTICATION OF A USER FOR ACCESS

CROSS-REFERENCE TO RELATED APPLICATIONS

This application is a U.S. National Phase Application of International Patent Application No. PCT/EP23/53420, filed Feb. 13, 2023, which claims priority to EP Patent Application No. 22156760.5 filed Feb. 15, 2022, each of which is hereby incorporated by reference herein.

TECHNICAL FIELD

The present invention is in the field of authentication processes for authenticating a user for access. In particular, it relates to a method for authenticating a user for access involving at least a first device and a second device, a device, non-transitory computer-readable data medium storing a computer program including instructions for executing steps of the method, use of an access signal indicating whether the user has access for operating an access system.

TECHNICAL BACKGROUND

In general, access, such as access to a certain area or device, can be limited by various restrictions. Examples are company areas that should only be accessed by employees or venues whose access is limited such that only persons having paid the fee are allowed to pass an entrance. For this purpose, objects of proof are presented having the inherent of weakness that they can be lost, stolen or forgotten leaving a burden on the user for taking care about the object of proof and hindering misuse.

CN 112837432 A provides a station ticket checking system determining in-station user information through the in-station user determination device, and sends the in-station user information to the server; the server determines a user feature data set of the in-station user from a user feature database according to the information and collects target user features through the ticket checking gate control device; a ticket checking processing request for the target user features is to the server, the server determines target user information corresponding to the target user characteristics from the user feature data set of the in-station users, and executes ticket checking processing on the target user; and the opening of the ticket checking gate machine is controlled by the ticket checking gate machine control device. The user is identified by the system e.g. through face identification. Performing face authentication at each point of access (POA) requires high-security hardware at every POA associated with high costs for each device involved.

It was an object of the invention to overcome these disadvantages, in particular to provide a process for providing user access which is more cost-efficient, easy and fast to relocate. These and other objects, which become apparent upon the following description, are solved by the subject matter of the independent claims. The dependent claims refer to preferred embodiments of the invention.

SUMMARY OF THE INVENTION

These objects were achieved by the present invention. In one aspect it relates to a method for authenticating a user for access involving at least a first device and a second device comprising:

a) receiving an access request, b) in response to the access request, recording at least one image with the first device, c) extracting at least one facial feature of the at least one image, d) receiving a template from the second device, e) generating an access signal indicative of whether the user has access based on a comparison of the at least one facial feature and the template, f) outputting the access signal.

In another aspect the invention relates to a device comprising:

a) an input for receiving a request for access and/or receiving a template, b) a camera for recording at least one user image in response to the request for access, c) a processor for extracting at least one facial feature of the at least one user image and/or comparing the at least one facial feature with the template, d) an output for outputting the access signal.

In another aspect the invention relates to a non-transitory computer-readable data medium storing a computer program including instructions for executing steps of the method according to any one of the preceding claims.

In another aspect the invention relates to a use of an access signal indicating whether the user has access for operating an access system.

In another aspect, it relates to a system comprising at least a first device and at least one second device, wherein the at least one first device is configured for recording at least one image with the first device in response to an access request, and wherein the second device is configured for receiving a template from the second device, and wherein at least one of the at least one first device and/or the at least one second device is configured for receiving an access request and extracting at least one facial feature of the at least one image and generating an access signal indicative of whether the user has access based on a comparison of the at least one facial feature and the template and outputting the access signal.

Any disclosure and embodiments described herein relate to the methods, the devices, computer readable media lined out above and vice versa. Advantageously, the benefits provided by any of the embodiments and examples equally apply to all other embodiments and examples and vice versa.

As used herein "determining" also includes "initiating or causing to determine", "generating" also includes, "initiating or causing to generate" and "providing" also includes "initiating or causing to determine, generate, select, send or receive". "Initiating or causing to perform an action" includes any processing signal that triggers a computing device to perform the respective action.

The methods, devices and computer readable media disclosed herein provide an efficient, sustainable and robust way for providing access to a user. The distribution of the facial authentication process for authenticating a user for access over at least a first device and a second device allows for one of the devices being the object of proof itself while misuse of the object of proof is hindered by deploying a safe authentication. Furthermore, the distribution advantageously lowers the technical requirements for at least one of the devices ultimately lowering the cost for such devices and for a whole access system. In an example, an area may accessible via several access gates. In such a scenario, the technical requirements and thus, the costs for all the access gates are lower and only one other device is needed for secure authentication compared to a situation where every access gate would need to be equipped with high-cost technology. As a consequence, improved processes for authenticating a user for access is made available to a wide range of use cases. At the same time the user is relieved of a burden that normally comes with an object of proof. The invention provided herein is suitable for outputting an access signal and this access signal may be suitable for operating an access system. Hence, the invention provides a way to derive access signals essential when operating an access system. By lowering the costs for providing an access signal, ultimately the cost of an access system comprising an access signal providing unit are lowered. As will be acknowledged by a person skilled in the art an access signal providing unit is essential in an access system as well as an access granting unit such as a gate.

A "first device" is a device configured for recording at least one image. In some embodiments, the first device may be a non-stationary device or may be integrated into a non-stationary device.

The term "non-stationary device" specifically may refer, without limitation, to a mobile electronic device, more specifically to a mobile communication device such as a cell phone, smartphone or smartwatch. Additionally or alternatively, the mobile device may also refer to a laptop, a tablet or another type of portable computer. In other embodiments, the first device may be integrated in a stationary device and/or may be a stationary device. Such a stationary device may be non-movable by human like entries e.g. with gates, pillars or similar access limiting objects, POA, building, vehicle, B-pillars or the like.

A "second device" is a device configured for providing a template. The second device may be or may be integrated into a non-stationary device or a stationary device as described in the context of the first device. In addition or alternatively, the second device may contain a chip, preferably a chip configured to function as an RFID-tag and/or NFC-tag. Such a chip may be integrated in a device. In some embodiments, the second device may be a stationary device wherein the first device may be a non-stationary device. In other embodiments, the second device may be a non-stationary device wherein the first device may be a stationary device.

For providing the template from the second device, a wireless near-field transmission may be established between the second device and the device receiving the template, preferably the first device. Examples for wireless near-field transmission techniques are Bluetooth, RFID, especially NFC and the like.

An "access request" comprises a signal indicating a user requesting access. Access may be requested for the entry into a virtual entity and/or a physical entity, e.g. an area with somehow restricted access, for example security areas, rooms, apartments, vehicles, parts of the before mentioned examples, functions of a device or the like. In such a scenario, the access for users may be restricted according to regulations like number of users in the restricted area, properties of the user, purchases of the user, memberships of user or affiliation of the user. Properties of the user may be age, a health status such as the vaccination status, briefing status including instructions needed for accessing an area, especially interesting in the context of user security, or the like. Purchases of the user may include tickets for any kind of event or facility. In other scenarios, users may be provided access via applying for a membership or by being an employee of a company. The access request may be generated with the first device and/or the second device. The access request may be initiated by the user. The user may initiate the access request by approaching at least one of the devices. The approach may be detected by a motion detector. Detecting a motion may trigger the motion detector to generate an access request. The access request may then be provided. In some embodiments, the user may be operating the first device or the second device and may initiate to send an access request with at least the first device or the second device. The access request may be received by at least the first or second device.

As used herein, without limitation, the term "image" refers to data recorded by using a camera, such as a plurality of electronic readings from the imaging device, such as the pixels of the camera chip. The image itself may comprise pixels, the pixels of the image correlating to pixels of the matrix of the sensor element. The image may be at least one two-dimensional image. In some embodiments, the image may be an RGB (red green blue) image. In other embodiments the image may comprise reflection pattern generated in response to illuminating the user with patterned light. For the extraction of at least one facial feature, the image may include at least parts of a user's face.

In this context, "recording" also includes capturing and/or generating an image.

A "facial feature" is associated with characteristic feature of a user's face. The facial feature may be extracted from an image indicating characteristics of a user's face. The image may be encoded as at least one facial feature. The at least one facial feature may be represented as n-dimensional vectors of numerical values in a feature space. The feature space may be an n-dimensional vector space. Examples of the at least one facial feature can be but are not limited to eyes, nose, forehead, irregularities such as scars, wrinkles or the like, cheeks including cheek-bone, chin, ears and/or mouth. In the context of the invention, at least one facial feature may be extracted by encoding the at least one facial feature as an n-dimensional vector in a feature space.

A "template" is a reference for the at least one facial feature. The template may comprise at least one template feature. The at least one template feature encodes at least one facial feature of a user with access rights or an enrolled user. The at least one template feature may be represented as n-dimensional vectors of numerical values in a template space. The template space may be an n-dimensional vector space. Alternatively or additionally, the template may be generated from an image of the user with access rights or an enrolled user by extracting the at least one template features. The image of the user with access rights or an enrolled user may be suitable for extracting at least one template feature. The template may be stored on the second device, preferably in a secure element (e.g., secure integrated circuit). A secure element is a tam-per-proof integrated circuit that is permanently built into the apparatus or may be a removable element.

Generally, a user with access rights refers to a user possessing the right to access. A user with access rights and/or an enrolled user may be a user approved for accessing. The user may be approved by the account provider. The account provider can be any institution or person qualified for providing a user with access rights. The generation of the template may be part of an enrollment process of the user. The enrollment process of the user may be completed before the access request may be received. In addition, the enrollment process may comprise a step of recording an enrollment image of the user. From the enrollment process enrollment user data may be generated. Enrollment user data may comprise a template. In some embodiments, the enrollment user data further comprises person-related data and/or account-related data and/or device-related data. The person-related data may comprise data defined by the user. The ac-count-related data may be defined by the account provider. The device-related data may be defined by the device, e.g. the first device and/or the second device. In some embodiments, the person-related data and/or the account-related data and/or device-related data may be suitable to identify a user. The template may be suitable for a comparison with the extracted at least one facial feature.

A comparison of a template and the at least one facial feature is associated with determining the similarity between the template and the image. The similarity may be determined by determining the similarity between the at least one template feature and the at least one facial feature. For determining the similarity between the at least one template feature and the at least one facial feature, the distance between the feature vector and the template vector may be calculated.

An "access signal" is a signal indicating whether a user has access. Recording an image of a user having access generally results in an access signal indicating grant of access. Recording an image of user not having access generally results in an access signal indicating refusal of access. Access may be granted when matching the template and the at least on facial feature. Access may be refused when mismatching the template and the image. Matching the template and the image may correspond to a matching score equal or higher than a predetermined threshold. Mismatching the template and the image may correspond to a matching score below the threshold. The matching score may be a measure for the distance between the feature vector and the template vector. A larger distance may correspond to a lower matching score and vice versa. The threshold can be selected depending on the required certainty for generating an access signal correctly indicating grant of access, so minimizing the false positive rate. This comes at the cost of authenticating too few users, i.e. yield a high false negative rate. The threshold is hence usually a compromise between minimizing the false positives rate and keeping the false negative rate at a moderate level. The threshold may be selected to obtain an equal or close to equal false negative rate and false positive rate. The access signal may be suitable for transmitting the grant or refusal of access. The access signal may be suitable for operating an access system.

An "input" for receiving the access request is one or more of serial or parallel interfaces or ports, USB, Centronics Port, FireWire, HDMI, Ethernet, Bluetooth, RFID, Wi-Fi, USART, or SPI, or analogue interfaces or ports such as one or more of ADCs or DACs, or standardized interfaces or ports to further devices.

For recording an image of the user, the device is equipped with a camera. In some embodiments, the device may be equipped with more than one camera. The term "camera" specifically may refer, without limitation, to a device having at least one imaging element configured for recording or recording spatially resolved one-dimensional, two-dimensional or even three-dimensional optical data or information. The camera may be a digital camera. As an example, the camera may comprise at least one camera chip, such as at least one CCD chip and/or at least one CMOS chip configured for recording images. The camera may be or may comprise at least one near infrared camera and/or an RGB camera. Furthermore, the camera, besides the at least one camera chip or imaging chip, may comprise further elements, such as one or more optical elements, e.g. one or more lenses.

While recording the image the user may be illuminated with light, eventually being RGB light or preferably IR flood light and/or patterned light.

The "processor" is a local processor comprising a central processing unit (CPU) and/or a graphics processing units (GPU) and/or an application specific integrated circuit (ASIC) and/or a tensor processing unit (TPU) and/or a field-programmable gate array (FPGA). The processor may also be an interface to a remote computer system such as a cloud service. The processor may include or may be a secure enclave processor (SEP). An SEP may be a secure circuit configured to authenticate an active user, e.g. the user that is currently using device. A "secure circuit" is a circuit that protects an isolated, internal resource from being directly accessed by an external circuit. The internal resource may be memory that stores sensitive data such as personal information, e.g. biometric information or medical information, encryptions keys or random number generator seeds. The internal resource may also be circuitry that performs services/operations associated with sensitive data. In some embodiments, the camera may communicate the at least one image to a secure enclave processor via a secure channel. The secure channel may be, for example, either a dedicated path for communicating data (i.e., a path shared by only the intended participants) or a dedicated path for communicating encrypted data using cryptographic keys known only to the intended participants. In other embodiments, the facial features may be extracted and transmitted via the secure channel.

An "output" for outputting the access signal indicating whether a user has access is one or more of serial or parallel interfaces or ports, USB, Centronics Port, FireWire, HDMI, Ethernet, Bluetooth, RFID, Wi-Fi, USART, or SPI, or analogue interfaces or ports such as one or more of ADCs or DACs, or standardized interfaces or ports to further devices.

"Computer-readable data medium" refers to any suitable data storage device or computer readable memory on which is stored one or more sets of instructions (for example software) embodying any one or more of the methodologies or functions described herein. The instructions may also reside, completely or at least partially, within the main memory and/or within the processor during execution thereof by the computer, main memory, and processing device, which may constitute computer-readable storage media. The instructions may further be transmitted or received over a network via a network interface device. Computer-readable data medium include hard drives, for example on a server, USB storage device, CD, DVD or Blue-ray discs. The computer program may contain all functionalities and data required for execution of the method according to the present invention or it may provide interfaces to have parts of the method processed on remote systems, for example on a cloud system. The term "non-transitory" has the meaning that the purpose of the data storage medium is to store the computer program permanently, in particular without requiring permanent power supply.

The access signal may be suitable for operating an access system. Access system may comprise hardware components. The hardware components may be or may be included into blocking elements such as a locker, a gate, a door, a wall, a pillar and/or the like. Access system may comprise software components. The software components may be or may be included into an unlock entity of an operating system, an application or the like, or providing information suitable for initiating a physical action.

In some embodiments, the access request may further comprise access user data. Access user data may be associated with the user and/or the account of the user and/or the at least one first device and/or second device. The access user data may comprise user-related data and/or ac-count-related data and/or device-related data. User-related data may be associated with the user and/or provided by the user, e.g. name, birthday, biometric information, an image of the user or the like. Account-related data may be associated with the account of the user and/or provided by the account provider, e.g. account ID, password, username and the like. Device-related data may be associated with a device providing the access request and/or with a device for providing a template and/or a device for recording an image, e.g. the first device and/or the second device. The device-related data may be provided by the device. Examples for device-related data may be but are not limited to device ID, IP address and/or telephone number. The access user data may be related to the identity of the user. The identity of a user may be associated with a name, a birthday, a city of birth, an address, an identity of another user such as the identity of a family member user ID, a personal device such as a smartphone or smartwatch, a passport ID or the like Therefore, the access user data may be suitable for identifying the user. The access user data may be collected with the first device or the second device.

In some embodiments, the access user data may be used for generating a process decision. Generating a process decision may be based on a comparison of access user data and enrollment user data. Enrollment user data may be generated in an enrollment process of a user. Enrollment user data may comprise a template, user-related data and/or account related data and/or device-related data. A process decision may indicate the continuation or the termination of a process. A process decision indicating the termination of a process may result in the generation of an access signal indicating refusal of access and a process decision indicating the continuation of a process may result in the generation of an access signal indicating grant or refusal of access generated by comparing the template and the at least one facial feature. By doing so, the comparison of the template and the at least one facial feature may be not necessary. Since the process decision determines whether the user may be a user with access rights by comparing access user data with the enrollment data, a process decision indicating termination of a process always results in an access signal indicating refusal of access. The reason for this is that the at least one facial feature of a user without access rights and/or a non-enrolled user may not be matched with the template being a template of a user with access right and/or an enrolled user.

In some embodiments, the second device may receive the access user data for selecting the template. The template may be associated with user-related data and/or account-related data and/or device-related data generated in an enrollment process. The template may be selected by comparing the access user data and the enrollment data. In response to access user data matching the enrollment data, the template corresponding to the enrollment data may be selected.

In some embodiments, the at least one image may comprise a reflection pattern generated in response to illumination with patterned light. Patterned light may comprise at least one reflection feature and may be projected onto the user. The light pattern may be a cloud of periodic or non-periodic dots, hence a reflection feature may be a dot. The light may be in the infrared range, preferably in the near-infrared range.

Further, the generation of an access signal may be further based on skin detection that may be determined based on the image. Skin detection may be based on an image comprising a reflection pattern. The reflection pattern may be a result of light emitted from the illumination source may be reflected by the surface of the skin and also partially may be penetrating the skin into the different skin layers and may be scattered back therefrom overlying the reflection from the surface. This may lead to a characteristic broadening or blurring of the reflection features reflected by skin. The characteristic broadening or blurring may be specific for a material. This characteristic broadening can be detected in various ways. For example, it is possible to apply image filters to the reflection features, for example a luminance filter; a spot shape filter; a squared norm gradient; a standard deviation; a smoothness filter such as a Gaussian filter or median filter; a grey-level-occurrence-based contrast filter; a grey-level-occurrence-based energy filter; a grey-level-occurrence-based homogeneity filter; a grey-level-occurrence-based dis-similarity filter; a Law's energy filter; a threshold area filter. In order to achieve best results, at least two of these filters are used.

The result when applying the filter can be compared to references. The comparison may yield a similarity score, wherein a high similarity score indicates a high degree of similarity to the references and a low similarity score indicates a low degree of similarity to the references. If such similarity score exceeds a certain threshold, the reflection feature may be qualified reflection feature being reflected by skin. The threshold can be selected depending on the required certainty that only skin reflection features shall be taken into account, so minimizing the false positive rate. This comes at the cost of identifying too few reflection features are recognized as skin reflection features, i.e. yield a high false negative rate. The threshold is hence usually a compromise between minimizing the false positives rate and keeping the false negative rate at a moderate level. The threshold may be selected to obtain an equal or close to equal false negative rate and false negative rate.

It is possible to analyze each reflection feature separately. This can be achieved by cropping the image showing the body part while it is illuminated with patterned light into several partial images, wherein each partial image contains a reflection feature. It possible that a partial image contains one reflection feature or more than one reflection features. If a partial image contains more than one reflection feature, the determination if a particular reflection feature is a skin reflection feature is based on more than one partial images. This can have the advantage to make use of the correlation between neighboring reflection features.

The determination of skin reflection features can be achieved by using a machine learning algorithm. The machine learning algorithm is usually based on a data-driven model which is parametrized to receive images containing a reflection feature and to output the likelihood if the reflection feature is skin or not. The machine learning algorithm needs to be trained with historic data comprising reflection features and an indicator indicating if the reflection feature has been reflected by skin or not. Particularly useful machine learning algorithms are neural networks, in particular convolutional neural networks (CNN). The kernels of the CNN can contain filters as described above capable of extracting the skin information out the broadening or blurring of the reflection feature.

By detecting skin, the access signal may indicate whether a user has access based on the comparison of the template and the at least one facial feature. Not detecting skin may result in refusal of access.

In some embodiments, the first device and/or the second device may be a smartphone.

In some embodiments, the device may further comprise an illumination source for illuminating the user with light. The device may be a first device. The illumination can be achieved by using a projector or illumination source which emits the light pattern onto the body part. The illumination source may comprise at least one light source. The illumination source may comprise a plurality of light sources. The illumination source may comprise an artificial illumination source, in particular at least one laser source and/or at least one incandescent lamp and/or at least one semiconductor light source, for example, at least one light-emitting diode, in particular an organic and/or inorganic light-emitting diode. As an example, the light emitted by the illumination source may have a wavelength of 300 to 1100 nm, especially 500 to 1100 nm. Additionally or alternatively, light in the infrared spectral range may be used, such as in the range of 780 nm to 3.0 μm. Specifically, the light in the part of the near infrared region where silicon photodiodes are applicable specifically in the range of 700 nm to 1100 nm may be used. Using light in the near infrared region allows that light is not or only weakly detected by human eyes and is still detectable by silicon sensors, in particular standard silicon sensors. The illumination source may be adapted to emit light at a single wavelength. In other embodiments, the illumination may be adapted to emit light with a plurality of wavelengths allowing additional measurements in other wavelengths channels. The light source may be or may comprise at least one multiple beam light source. For example, the light source may comprise at least one laser source and one or more diffractive optical elements (DOEs). The illumination source may comprise at least one line laser. The line laser may be adapted to send a laser line to the object, for example a horizontal or vertical laser line. The illumination source may comprise a plurality of line lasers. For example, the illumination source may comprise at least two line lasers which may be arranged such that the illumination pattern comprises at least two parallel or crossing lines. The illumination source may comprise the at least one light projector adapted to generate a cloud of points such that the illumination pattern may comprise a plurality of point pattern. The illumination source may comprise at least one mask adapted to generate the illumination pattern from at least one light beam generated by the illumination source.

In an embodiment, the device comprising an input for receiving a request for access and/or receiving a template, a camera for recording at least one user image in response to the request for access, a processor for extracting at least one facial feature of the at least one user image and/or comparing the at least one facial feature with the template, an output for outputting the access signal may be a device configured for receiving a request for access and/or receiving a template, a camera for recording at least one user image in response to the request for access, a processor for extracting at least one facial feature of the at least one user image and/or comparing the at least one facial feature with the template, an output for outputting the access signal.

In an embodiment, the at least one first device and/or the at least one second device may be a mobile electronic device. In particular, mobile electronic device may be a mobile communication device. Examples for a mobile communication device may be a cell phone, smartphone, laptop, computer or smartwatch.

In an embodiment, template may be generated in an enrollment process. This is advantageous since by enrolling a user providing access does not rely on other verifications/credentials such as driver's license and the user is relieved from the burden of taken such a verification or credential with him.

In an embodiment, the device as described herein may be connected to at least one second device that may comprise a processor for extracting at least one facial feature of the at least one user image and/or comparing the at least one facial feature with the template.

In certain embodiments, more than one image may be recorded in response to the access request. At least one of the images may be suitable for extracting at least one facial feature of a user. The image quality of an image may not always be sufficient for authenticating the user due to movement, an insufficient amount of skin available for extracting at least one facial feature or other circumstances. By recording more than one image, the number of restarts of the authentication process can be lowered, overall increasing the process efficiency and the time a user needs to spend for authentication.

BRIEF DESCRIPTION OF THE DRAWINGS

In the following, the present disclosure is further described with reference to the enclosed figures.

DETAILED DESCRIPTION OF EMBODIMENT

Figure 1:
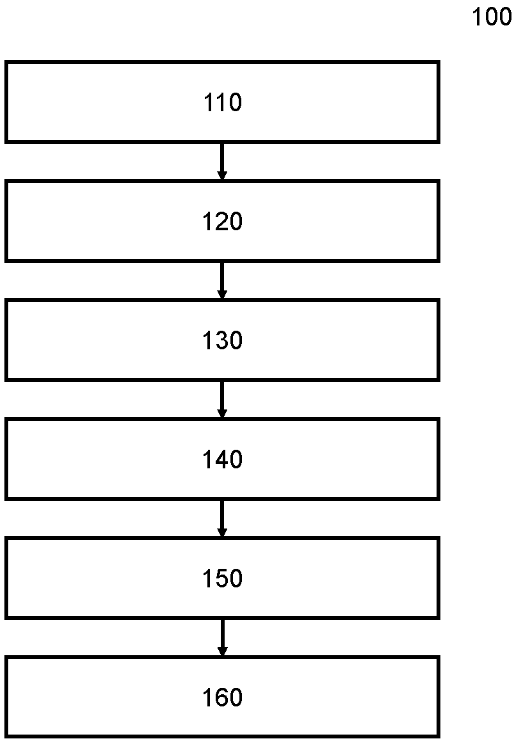
FIG. 1 illustrates a flow diagram of an example embodiment of a method for authenticating a user for access (100).

FIG. 1 illustrates a flow diagram of an example method for authenticating a user for access including a first and a second device (100).

In a first step, an access request is received (100). In some embodiments, the access request may be received by a first device or a second device. In certain embodiments, the user may be operating at least one device being the first device, the second device or any other device to initiate an access request. In an exemplary scenario, the user may be operating an application on one of the devices in order to initiate the generation of an access request. In other scenarios, the access request may be generated automatically when the distance between the first device and the second device is small. In certain embodiments, the first device and/or second device may be NFC-enabled. Followingly, the distance between the first device and the second device needs to be decreased such that data transfer is enabled. When the access request is received, it may initiate the process of user authentication.

In response to the access request, at least one image is recorded with the first device (120). An image of the user may comprise at least parts of the appearance of a user, preferably at least one part of the body, most preferred at least one part of a face of the user. In certain embodiments, more than one image may be captured as triggered by the access request to ensure one image being suitable for extracting at least one facial feature of a user. For example, a user may not always be captured with a sufficient quality. In such a scenario, a check may be included in order to select the image suitable for extracting at least one facial feature. The check may comprise determining the quality of the image by determining the number of datapoints in the image suitable for extracting the at least one facial feature. A quality threshold may be needed to overcome for proceeding with the recorded image.

While recording the image the user may be illuminated with light. In certain embodiments, the light may be RGB light, IR flood light or structured light, preferably structured or flood light in the IR range. The user may be illuminated with light by the first device and/or the second device or any other illumination source such as a lamp.

From the at least one image at least one facial feature of the user is extracted (130). In certain embodiments the extraction of at least one facial feature of the at least one image may be conducted on the first device, the second device or any other device configured to extract at least one facial feature. Extracting at least one facial feature may be associated with encoding the at least one image as n-dimensional facial vectors. Each feature vector may define facial features for the user from either a single image, from a composite image (e.g., an image that is a composite of several images), or from multiple images. As feature vectors are generated from a single user's facial features, the feature vectors may be similar to one another because the feature vectors are associated with the same person and may have some "clustering".

In another step, a template is received from the second device (140). In certain embodiments, the template may be received by the first device or any other device. The template may be a template of a user with access rights. The template may comprise template features. The template may be generated from the image of the user by extracting template features of the images. Template features may comprise template features of a user with access rights. Extracting at least one template feature may be associated with encoding the at least one image as n-dimensional facial vectors. Each template vector may define template features for the user from either a single image, from a composite image (e.g., an image that is a composite of several images), or from multiple images. As template vectors are generated from a single user's facial features, the template vectors may be similar to one another because the template vectors are associated with the same person and may have some "clustering". A user with access rights may be a user approved for accessing and/or an enrolled user, for example by an account provider such as an employer in the exemplary scenario of providing access to an employee to enter the company area or authenticating a user for access of car wherein the user may own the car and/or may rent the car, e.g. in a car sharing process or the like. In some embodiments, the template may be stored on the device receiving the template, preferably the first device. By doing so, the second device is only needed once and the user can authenticate at the first device without requiring the second device to provide the template. In one scenario, the second device, e.g. a smartphone, can still be used to prompt an access request. In another scenario, the second device may not be needed for prompting an access request anymore and the first device may be sufficient for authentication. This is advantageous in the sense that the provided method is also available for users without a device suitable for being a second device, e.g. Older people. The second device for providing the template may be provided by a person other than the user. For example, older people buying a car without possessing a second device may use a device from the merchant as a second device.

Further, the template features are generated by extracting features of the enrollment image (150). Extracting template features may be conducted according to the extraction of at least one facial feature as described above. The template may be stored in a memory on the second device and/or be received from a device other than the first device by the second device. In certain embodiments, the device other than the first device may be a computing unit such as a server comprising a database.

By comparing the at least one facial feature extracted from the user image recorded by the first device with the template an access signal indicating whether a user has access is generated. The access signal may be generated on the first device and/or the second device and/or any other device. The access signal may indicate the grant of access comprising a request to grant access to a user. Access may be granted by matching the at least one facial feature of the user with the template. Access may be refused when mismatching the at least one facial feature of the user with the template. In certain embodiments, a match may be achieved if a matching score is higher than a threshold. In this case, the access signal may indicate the grant of access. In certain embodiments, the matching score may be higher if feature vector of the at least one facial feature and the at least one template feature are closer in distance and may be lower if they are more distant. In the second case, the access signal may indicate the refusal of access. In other embodiments, a match may not be achieved if the matching score is lower than the threshold. In this case, the access signal may indicate the refusal of access. In certain embodiments, a matching score may be determined by comparing the at least one facial feature and the template. This may include using one or more classifiers or a classification-enabled network to classify and evaluate the differences between the generated feature vectors and feature vectors from the template space. Examples of different classifiers that may be used include, but are not limited to, linear, piecewise linear, nonlinear classifiers, support vector machines, and neural network classifiers.

Figure 2:
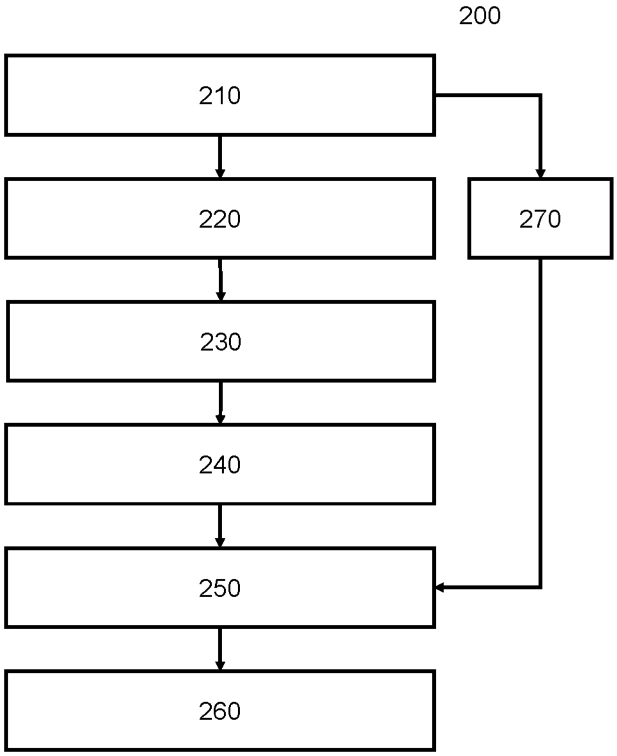
FIG. 2 illustrates a flow diagram of an example embodiment of a method for authenticating a user for access including a process decision (200).

In a last step, the access signal indicating whether a user has access is output (160). The access signal may be output by the first device and/or second device and/or any other device. Additionally, the access signal may comprise information in the form of Boolean values to indicate the grant or refusal of access. In some embodiments the access signal may comprise further information, e.g. user data, information related to the steps performed by the first device and/or second device or the like. In certain embodiments, the access signal is suitable for operating an access system. In some embodiments, an access signal indicating a grant of access may result in an access action to provide access to the user and no access action as a result to an access signal indicating refusal of access. In certain embodiments, an access signal indicating refusal of access may be followed by restarting the procedure by taking recording another image of the user or another device may be requested for recording an image of the user or an indication of the access signal indicating refusal of access may be provided to the user or no further step may be conducted. Examples of access actions may be opening a gate, removing blocking elements in order to let a user pass or providing a password for entering at a POA to access. FIG. 2 illustrates a flow diagram of an example embodiment of a method for authenticating a user for access including a process decision (200).

In a first step, an access request is received (210) as described in the context of FIG. 1. Furthermore, the access request may comprise access user data. In this context, access user data may be associated with the user and/or the account of the user and/or the first and/or second device. Exemplary, the access user data may be data given by the user and/or the account provider and/or the one of the devices. Such data can be an account ID given to the user. In some embodiments, the second device may comprise a chip. The chip may store the account ID and provide the account ID at an access gate.

In another step, at least one image is recorded with the first device (220) as described in the context of FIG. 1.

From the at least one image at least one facial feature is extracted (230) according to the steps described in the context of FIG. 1.

In another step, a template is received from the second device (240) as described in the context of FIG. 1.

By comparing the access user data with enrollment user data, the process decision is generated (250). The enrollment user data may be received from the first device and/or the second device and/or any other device such as a computing unit like a server comprising a database. Further, enrollment user data may be generated in a preceding enrollment process. The enrollment process may comprise the steps as described in the context of FIG. 1. Comparing the access user data with enrollment user data may result in a match. Such a match may be achieved when the enrollment user data comprises the user data. Matching the user data with enrollment user data may result in a process decision indicating the continuation of a process. Not matching the user data with enrollment user data may result in a process decision indicating the termination of a process.

In another step, the generation of an access signal as described in the context of FIG. 1 may be further based on the process decision (270). A process decision indicating the termination of a process results in an access signal indicating the refusal of access. In some embodiments, the access signal may be indicating the refusal of access without the need for generating a matching score. In other embodiments, the indicating the refusal of access may lower the matching score such that the matching score may be lower than the threshold. In some embodiments, the matching score may not be modified according to an access signal indicating grant or refusal of access and the access signal may be generated according to the description in the context of FIG. 1.

In a last step, the access signal indicating whether a user has access is output (260) as described in the context of FIG. 1.

Figure 3:
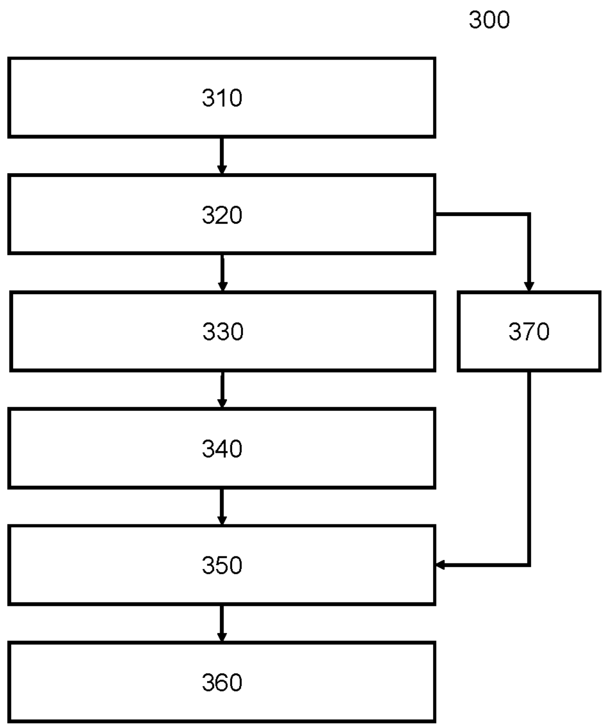
FIG. 3 illustrates a flow diagram of an example embodiment of a method for authenticating a user for access including a skin detection (300).

FIG. 3 illustrates a flow diagram of an example embodiment of a method for authenticating a user for access including skin detection (300).

In a first step, an access request is received (310) as described in the context of FIG. 1.

In another step, at least one image is recorded (320) as described in the context of FIG. 1. The at least one image may comprise a reflection pattern generated in response to illuminating the user with patterned light. In some embodiments, more than one image may be captured. One of the images may be an image suitable for extracting at least one facial feature and another image may be suitable for detecting skin (370).

From the image at least one facial feature is extracted (330) as described in the context of FIG. 1.

In another step, a template is received as (340) described in the context of FIG. 1.

In another step, an access signal is generated based on a comparison of the at least one facial feature with the template (350) as described in the context of FIG. 1 or FIG. 2 in a response to detecting skin in a preceding step. Not detecting skin may result in an access signal indicating refusal of access. In some embodiments, the access signal may indicate refusal of access without the need for generating a matching score. In other embodiments, the process decision indicating the refusal of access may lower the matching score such that the matching score may be lower than the threshold.

In a last step, the access signal is output (360) as described in the context of FIG. 1.

Figure 4:
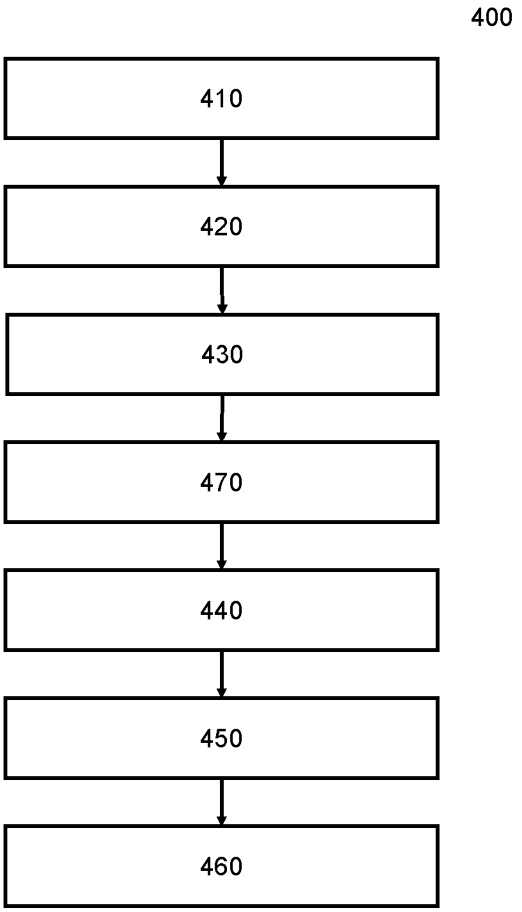
FIG. 4 illustrates a flow diagram of an example embodiment of a method for authenticating a user for access including receiving access user data on the second device for selecting a template (400).

FIG. 4 illustrates a flow diagram of an example embodiment of a method for authenticating a user for access including receiving access user data on the second device for selecting a template on the second (400).

In a first step an access request is received (410) as described in the context of FIG. 2.

In a next step, an image is captured by the first device (420) as described in the context of FIG. 1.

From the image at least one facial feature is extracted (430) as described in the context of FIG. 1.

In some embodiments, the second device may have access to more than one template. The more than one templates may be stored on the second device and/or may be provided to the second device from a device other that the first device or second device, e.g. a computing unit such as a server comprising a database. In such scenarios, a selection of one template may be a preceding step to receiving a template from the second device. The selection of a template may be based on the access request (470). The access request may comprise access user data as described in the context of FIG. 2. The access user data may be collected before receiving the access request, more specifically before or overlapping with generating an access request. The access user data may be collected by the first device and/or the second device and/or any other device.

In certain embodiments the template may be associated with other enrollment user data such as person-related data and/or account-related data. The enrollment user data may be stored on the second device and/or may be provided to the second device from a device other that the first device or second device, e.g. a computing unit such as a server comprising a database. The selection of a template may be based on the access user data. The access user data may be access user data as described in the context of FIG. 2. To select the template, the enrollment user data may comprise the access user data. This is verified by matching the information of the access user data with the enrollment user data. In response to matching the access user data with the enrollment user data, the template corresponding to the enrollment user data may be selected. The enrollment user data and the access user data may be matched by a device other than the first device. The selected template may then be provided by the second device.

With the selection of the template (470), the template is provided by the second device (440) In a next step, the access signal is generated (450) as described in the context of FIGS. 1 and/or 2 and/or 3.

In a last step, the access signal is output (460) as described in the context of FIG. 1.

Figure 5:
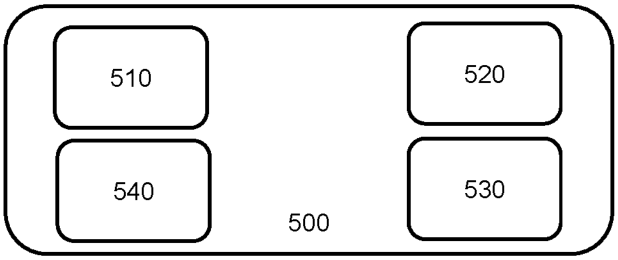
FIG. 5 illustrates a block diagram of an exemplary device comprising an input, a camera, a processor and an output (500).

FIG. 5 illustrates a block diagram of a device comprising an input, a camera, a processor and an output (500).

The input (510) is configured to receiving an access request and/or receiving a template as described in the context of FIG. 1. In some embodiments, the input may be configured to receiving material information and/or enrollment user data and/or receiving at least one facial feature and/or a process decision as described in the context of FIG. 1 and/or FIG. 2 and/or FIG. 3. The input may be an interface that may be suitable to connect the device to at least one other device. The connection may be a wired and/or wireless connection such as one of ethernet, USB, LAN, WLAN and the like.

The camera (520) is configured to record at least one image in response to the access request as described in the context of FIG. 1.

The processor (530) is configured to extracting at least one facial feature of the at least one image and/or comparing the at least one facial feature with the template as described in the context of FIG. 1. In some embodiments the processer may be configured to generating a process decision according to the steps as described in the context of FIG. 1 and/or determining material information according to the steps as described in the context of FIG. 3.

The output (540) is configured to outputting the access signal as described in the context of FIG. 1 and/or FIG. 2. In some embodiments, the output may be configured to outputting an image and/or outputting at least one facial feature and/or outputting an access signal generated according to the steps described in the context of FIG. 1 and/or FIG. 2 and/or FIG. 3. The output may be an interface that may be suitable to connect the device to at least one other device. The connection may be a wired and/or wireless connection such as one of ethernet, USB, LAN, WLAN and the like.

In some embodiments, the device may additionally comprise an illumination source such as a projector for projecting a light pattern containing at least one pattern feature. The light pattern may be a cloud of periodic or non-periodic dots, hence a pattern feature may be a dot. The projector may emit in the infrared wavelength range, such as the near-infrared range. The projector may contain a laser and a diffractive optical element to generate the light pattern. The projector may also contain an array of vertical cavity surface emitting lasers (VCSEL) to generate the light pattern. Usually, the projector also contains lenses to focus the light beams onto the body part. The projector may be operated while an image may be captured with the camera of the device. The camera may be sensitive in at least parts of the wavelength area emitted by projector.

In the claims, the word "comprising" does not exclude other elements or steps, and the indefinite article "a" or "an" does not exclude a plurality. A single unit or device may fulfill the functions of several items recited in the claims. The mere fact that certain measures are recited in mutually different dependent claims does not indicate that a combination of these measures cannot be used to advantage.

Any disclosure and embodiments described herein relate to the methods, the systems, devices, the computer program element lined out above and vice versa. Advantageously, the benefits provided by any of the embodiments and examples equally apply to all other embodiments and examples and vice versa.

Example 1

One example may be the authentication of a user for providing access to a company area. In this scenario, the user requests access via his smartphone suitable for being a first device. In an application the user initiates the generation of an access request in his smartphone. By approaching the access gate (second device) controlling the access to the company area. The smartphone provides the access request including the employee number (unique per employee) to the access gate. The access gate uses the information to select a template associated with the employee by matching the received employee number with the employee numbers of employees with the right to access the company area. When the received employee number is matched with the employee number from the database the associated template is provided to the smartphone. In response to that, the smartphone starts the face authentication process and in the course of the authentication starts by recording an image of the user. The image is used to extract the facial features of the user by encoding the image as feature vectors. With the facial features of the employee extracted from the recorded image, in the secure enclave processor a trained CNN compares the facial features with the template and generates a confidence level of the user of the smartphone being the employee. If the confidence level overcomes the threshold determined for the authentication, the smartphone generates a signal in order to send a prompt to the access gate to open. If the confidence level cannot overcome the threshold, the user may be advised to try again. Sometimes, the smartphone may not be suitable for performing a secure authentication. In such a case, the access gate recognizing the non-suitability or the smartphone itself may advise the user to approach another device such as another access gate suitable for performing a secure authentication. This way, the number of access gates equipped with expensive technology is lowered depending on the technical equipment of the employees.

Example 2

In other scenarios, the authentication method may be deployed for providing access to a car. The car can be a car suitable for car-sharing. With a car being the first device, the user solely carries around a template on his mobile devices, eg. a smartphone, smartwatch or a chip included in a card suitable for carrying in a wallet. The template is then provided to the car via NFC from the smartwatch or the chip ensuring the close proximity of the user and the car indicating an access wish of the user. By using NFC, the risk of unintentionally unlocking a car is significantly lowered due to the very limited distance between NFC tag and reader. The access request in this case comprises the template. Alternatively or additionally, the access may be requested via a graphical user interface (GUI). In response to receiving the template, the car records an image of the user in order to extract facial features for a comparison with the template. The access signal generated based on the comparison performed in the computing unit is provided to the elements controlling the locking of the door. Further the mobile device may be used to start the motor when the user is inside the car again via prompting a signal transmitting the wish of the user for starting a car. An advantage of authenticating a user for access for a car in this way is that the user does not need to go through an enrollment process for each car, but only a template has to be generated (in some scenarios only the first time requesting access) in advance. The template may be generated in an enrollment process including the user and the car sharing provider. Otherwise, the template may be a generic template suitable for being used in several scenarios relating to authentication and for a specific use such as car sharing no further template generation would be necessary. An example could be the generation of a template based on the image of an ID of a user.

Another option would be the car being the second device and the authentication being performed with the mobile device (smartphone) of the user. This is advantageously since in this scenario, the car does not need to be equipped with a GUI or a camera. The process is similar to the one described above except that the smartphone carries out the steps of authentication and the car only provides the template and receives the access signal.

The invention claimed is:

1. A method for authenticating a user for access to a vehicle comprising:

a. receiving an access request from a mobile user device within a threshold proximity of the vehicle, the access request including a template, b. in response to the access request, recording an image, c. extracting at least one facial feature of the image, d. detecting skin within the image, e. in response to said detecting skin and to a feature vector of the at least one facial feature being within a threshold distance of a corresponding template feature of the template, generating an access signal indicative of the user having access to the vehicle, and f. controlling one or more components of the vehicle using the access signal.

2. The method according to claim 1, wherein said recording comprises recording the image by a device integrated into the vehicle.

3. The method according to claim 2, wherein said recording comprises recording the image by a device integrated into a B-pillar.

4. The method according to claim 1, wherein said controlling comprises starting the motor of the vehicle.

5. The method according to claim 1, wherein said controlling comprises unlocking the door of the vehicle.

6. The method according to claim 1, wherein the vehicle is a car.

7. The method according to claim 1, wherein the image comprises a reflection pattern generated in response to illumination with patterned light.

8. The method according to claim 7, wherein the illumination is in a range of from 700 nm to 1100 nm.

9. The method according to claim 8, wherein the illumination comprises a cloud of periodic dots.

10. The method according to claim 8, wherein the illumination is effected by a projector comprising an array of vertical cavity surface emitting lasers.

11. The method according to claim 1, wherein the illumination comprises a cloud of periodic dots.

12. The method according to claim 1, wherein said detecting skin is based on an image comprising a reflection pattern.

13. The method according to claim 12, wherein said detecting skin is based on several partial images obtained by cropping the image.

14. The method according to claim 13, wherein said detecting skin is based on a data-driven model which is parametrized to receive images containing a reflection feature and to output the likelihood if the reflection feature is skin or not.

15. The method according to claim 14, wherein the data-driven model is a neural network.

16. The method according to claim 1, wherein said recording comprises recording more than one image.

17. The method according to claim 16, wherein one of the images is an image suitable for extracting at least one facial feature and another image is suitable for said detecting skin.

18. The method according to claim 1, wherein the access signal is generated using a matching score as a measure for the distance between the facial feature and the template.

19. The method according to claim 17, wherein the image suitable for extracting at least one facial feature is selected based on the number of datapoints in the image.

20. A method for authenticating a user for access to a vehicle comprising:

a. receiving an access request from a mobile user device within a threshold proximity of the vehicle, the access request including user data, b. in response to the access request, recording an image, c. based on the user data, selecting, from a plurality of templates, a template;

d. extracting at least one facial feature of the image, e. detecting skin within the image, f. in response to said detecting skin and to the at least one facial feature being within a threshold matching range of the template, generating an access signal indicative of the user having access to the vehicle, and g. controlling one or more components of the vehicle using the access signal.

* * * * *